(12) United States Patent
Kwilinski

(10) Patent No.: US 7,036,840 B2
(45) Date of Patent: May 2, 2006

(54) TRAILER ALIGNMENT APPARATUS

(76) Inventor: Christopher M. Kwilinski, 3706 Thornwood Pl., Tampa, FL (US) 33618

( * ) Notice: Subject to any disclaimer, the term of this patent is extended or adjusted under 35 U.S.C. 154(b) by 54 days.

(21) Appl. No.: 10/816,117

(22) Filed: Apr. 1, 2004

(65) Prior Publication Data
US 2005/0218626 A1    Oct. 6, 2005

(51) Int. Cl.
*B60D 1/36* (2006.01)
(52) U.S. Cl. .............. 280/477; 280/432; 280/504; 280/511; 33/264; 116/28
(58) Field of Classification Search .......... 280/477, 280/432, 504, 511; 33/264; D12/162; 116/28
See application file for complete search history.

(56) References Cited
U.S. PATENT DOCUMENTS 5,970,619 A * 10/1999 Wells .................. 33/264
6,139,041 A * 10/2000 Murphy ............... 280/477
6,273,448 B1 * 8/2001 Cross .................. 280/477
6,827,363 B1 * 12/2004 Amerson .............. 280/477

* cited by examiner

*Primary Examiner*—Lesley D. Morris
*Assistant Examiner*—Marlon Arce-Diaz
(74) *Attorney, Agent, or Firm*—Yaté K. Cutliff

(57) ABSTRACT

A trailer alignment apparatus including a quick adjusting clamping system coupled with a mast that is fastened to a trailer hitch. The mast has an illumination means and a speaker means attached to and spaced from a first end of the mast. Further, the quick adjusting clamping system has a pressure actuated paddle switch assembly pivotally attached. The pressure actuated paddle switch assembly has a flap and a control lever. When the flap is engaged by a hitch ball of a towing vehicle, the control lever activates the illumination means and the speaker means to visually and audibly signal the operator.

16 Claims, 6 Drawing Sheets

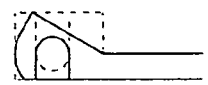
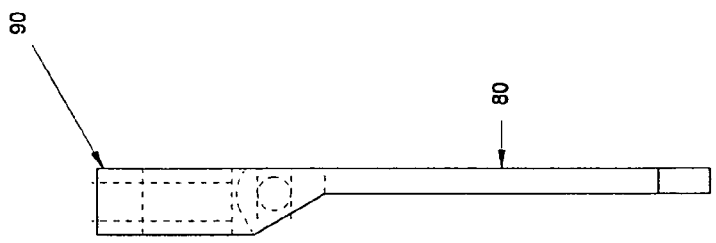
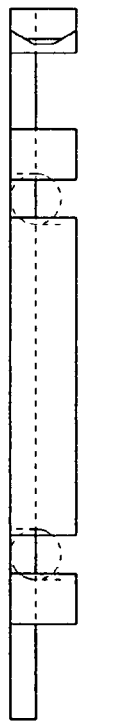
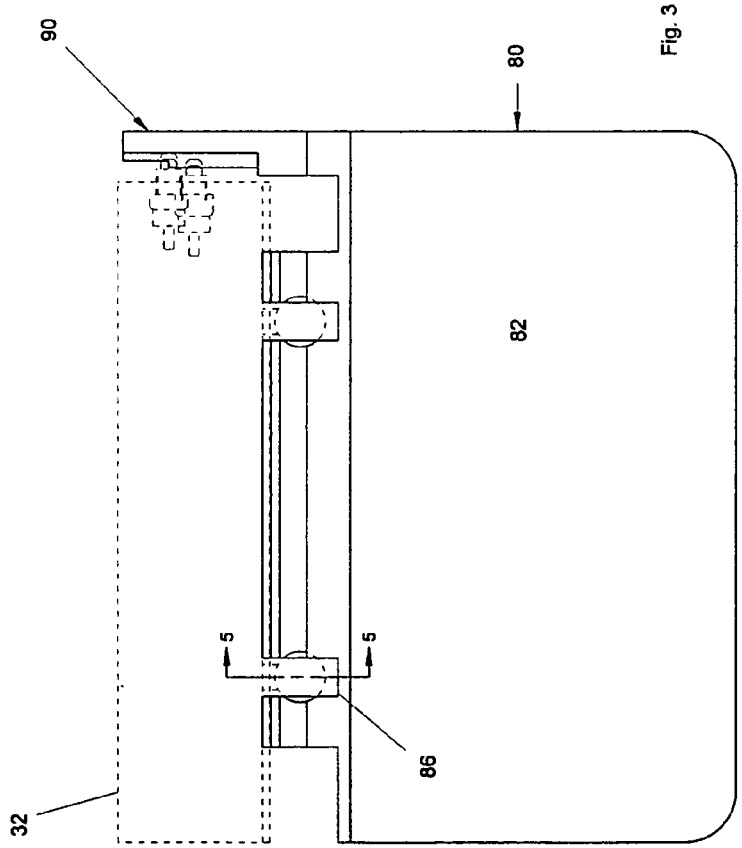

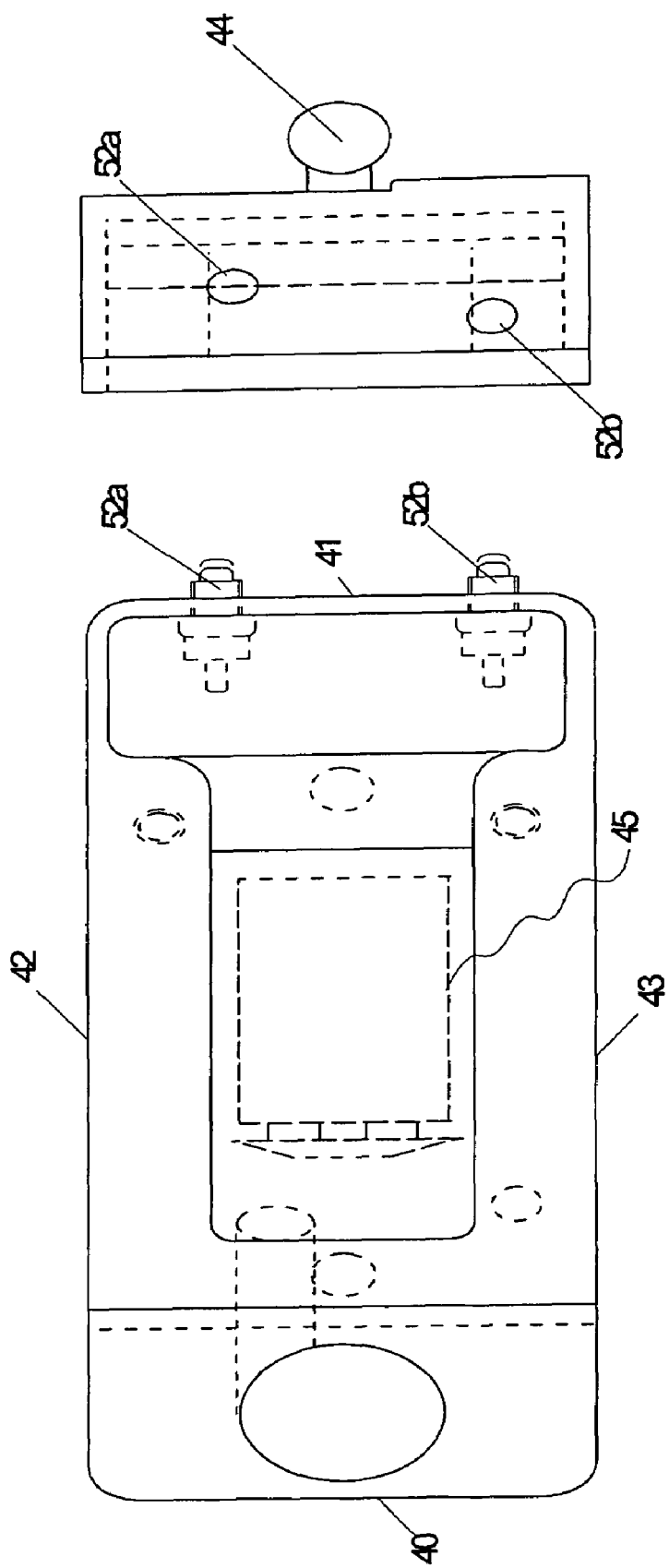

TRAILER ALIGNMENT APPARATUS

BACKGROUND OF THE INVENTION

1. Field of Invention

The present invention relates to a trailer alignment apparatus, and more particularly, pertains to an apparatus that assists with the alignment of the coupling elements of the towing vehicle with the coupling elements of a trailer or other towed vehicle.

2. Description of Related Art

Trailer hitches are widely used to couple a towing vehicle and trailer or other object to be towed. A variety of hitches and coupling mechanisms have been devised. No matter the design, the process of coupling the towing vehicle and the trailer or other object to be towed is time consuming. Further, the task usually requires two people to complete the hook-up. There is usually one person driving the towing vehicle and backing it up toward the trailer and a second person who is guiding the driver as the towing vehicle is backed up.

It is known that there are various types of hitch constructions available, as there are various types of couplers, which are attached to the end of the drawbar of a towed trailer. Specifically, there are two main types of drawbar couplers used by the majority of towed trailers. One is the lunette, which is a strong metal circular ring welded to the end of the drawbar. The ring is placed over the hitch ball mounted on the end of a hook shaped projection of the hitch. A closure latch on the hitch is pivotally moved into engagement with the top of the ball and traps the lunette thereon. Normally, the closure latch has a lock associated therewith to prevent the latch from moving upwardly out of its engaged position with the hitch ball.

Another type of coupler is a hooded coupler which has a hollow inverted semispherical-shaped hood mounted on the end of the drawbar. The hood is formed such that it can be placed over the top of the hitch ball and partially encloses the ball when the hood is lowered thereon. The hooded coupler usually will have locking means associated therewith to engage the ball and retain the coupler thereon while the trailer is being towed.

No matter the type of coupler, the majority of trailer hitches on a towing vehicle consist of a hitch ball mounted within a few inches of the rear bumper and at approximate bumper height. At the front end of the trailer terminating the drawbar is a cup or ring designed for receipt of the hitch ball. The ball of the trailer hitch on the back of the towing vehicle fits within the cup or ring on the draw bar of the trailer to be towed. The trailer is designed so that the wheels on the trailer are located between the center of gravity of the trailer and the rear end of the trailer. This means that the drawbar will be forced by the weight of the trailer toward the ground. It is ordinarily supported off the ground by a jack-like device that terminates at the ground end in a small wheel. The jack-like device is ordinarily operated by a crank, which raises and lowers the drawbar of the trailer, so that the height of the cup or ring, which receives the trailer hitch ball mounted on the towing vehicle may be varied by the operator by cranking the jack supporting the drawbar of the trailer either up or down, depending on the need of the operator. For safety reasons, the tongue weight of the drawbar of the trailer ordinarily must be, at least, fifty (50) pounds. For large trailers, it can be substantially more. Therefore, lifting the drawbar of the trailer without the use of the crank, or moving the drawbar laterally, requires considerable strength. Indeed, the strength required may be beyond that of most people for larger trailers or trailers that are heavily loaded. However, the tolerance of the receiving cup or ring on the drawbar and the ball on the towing vehicle trailer's hitch must be quite close in order that the attachment of the trailer to the towing vehicle is secure. Therefore, the ball of the trailer hitch of the towing vehicle must be positioned within a fraction of an inch immediately below the cup or ring on the drawbar of the trailer if the hitching process is to be successful.

With all current forms of hitch construction used when coupling a towing vehicle to a trailer vehicle, the operator of the tractor vehicle is generally unable to see the actual engagement of the hitch ball attached to the towing vehicle with the drawbar attached to the trailer, as the engagement is generally below the rear window of the towing vehicle. As such, when coupling the trailer and towing vehicle, the operator of the towing vehicle must back the hitch ball under the drawbar by either trial and error, or by placing helpers on either side of the trailer directing the towing vehicle operator which way to turn so that the hitch ball ultimately will be positioned vertically below the drawbar so that the drawbar can be lowered onto the hitch ball. As earlier stated, this method of aligning the hitch ball and the trailer drawbar is not time efficient. Moreover, often helpers are not available to guide the tractor operator as the hitch ball is positioned under the trailer drawbar.

In order to reduce the amount of time spent hooking the towing vehicle to the trailer or other object to be towed, guide devices have been developed. The other guide devices have been both mechanical and electrical.

For instance, U.S. Pat. No. 3,418,628 is an alignment device for a trailer hitch that has a plurality of pivotally mounted electrical switches that are actuated by the hitch ball of the towing vehicle. The '628 patent is a signal device which has a spherical member and a rod attached to an upper side of a flat base and a plurality of vertical tongues. The spherical member will fasten within the socket portion of the coupling member of the trailer hitch. The rod extends above the flat base and has three orientation lights. The pluralities of vertical tongues are hinged at the bottom of the flat base portion and activate a switch that sends power to the orientation lights. As the vehicle is backed toward the trailer, the hitch ball presses against one of the tongues with the proper tongue causing the center light to come to signal to the driver that he is in position to lower the trailer coupler onto the hitch ball.

U.S. Pat. No. 5,970,619 is a two-piece trailer alignment guide. One piece is a trailer cup attachment, which attaches to the trailer cup on the trailer to be towed. Extending vertically above the trailer cup attachment is a set of telescoping rods, which may extend to increase the vertical height of the trailer cup attachment. An alignment indicator is attached to one of the telescoping rods. On the face of the alignment indicator is a spring-activated switch. Above and spaced apart from the spring-activated switch are two green lights, which are shining to help the towing vehicle back correctly toward the trailer cup. The second piece is a towing vehicle attachment, which is affixed to the towing vehicle. This has an activator ball attached to telescoping rods, which are rotatably mounted in a mounting base that attaches to the towing vehicle. Therefore, when the activator ball touches the spring mounted switch on the alignment guide, the towing ball will be oriented, so that as the jack support for the drawbar on the trailer is lowered, then the trailer cup will fit directly over the ball on the towing vehicle. When the activator ball presses the spring-mounted switch on the alignment guide, two green lights stop shining, a red light comes on, and a sound generator makes a noise.

Another two-piece device is set out in U.S. Pat. No. 5,927,229, which is a visual aid system for attachment to a hitch attachment of a motor vehicle to a trailer. The motor vehicle has a first pole cantably affixed onto the hitch connector ball of the motor vehicle. The trailer has a second pole articulated to the hitch mechanism of the trailer so as to move to a position directly above the socket of the hitch mechanism. The first pole includes a pole member, and a receptacle affixed to a lower end of the pole member. The receptacle has a notch formed circumferentially around so as to receive an elastomeric band therein. The elastomeric band is interposed between the ball and the receptacle. The receptacle is cantable about the ball upon contact with the hitch mechanism of the trailer. The second pole comprises a pole member, an articulatable connector pivotally connected to an end of the pole member, and a base affixed to the hitch mechanism of the trailer. The articulatable connector is pivotally connected to the base. The base includes a bracket affixed directly on the hitch mechanism, a clip slidably received within the bracket, and a vertical member affixed at one end to the clip. The vertical member is connected to the articulatable connector. The bracket has a slot with a longitudinal axis aligned with the socket of the hitch mechanism. The clip is slidably received within the slot. A light emitting means is positioned on the first and second poles so as to emit light outwardly from the poles. The light emitting means is affixed at a top of each of the poles. The light emitting means is a cap, which is affixed to the top of each of the poles. The cap is formed of a transparent or translucent material, which contains a dispersion of a phosphorescent pigment therein. The phosphorescent pigment has the ability to emit light after being exposed to an outside light source, such as the headlamp of a vehicle.

Other examples of prior devices for guiding the person backing up the towing vehicle to a trailer or other object to be towed are disclosed in U.S. Pat. No. 4,583,481, U.S. Pat. No. 5,290,056, U.S. Pat. No. 5,951,035, and U.S. Pat. No. 6,259,357. These devices rely on mechanical devices that are not easily removed after the hitch ball is aligned with the trailer socket, or limited to the size of the hitch ball, or requires too much set up time.

Therefore, a need exists for a trailer hitch guide where a single operator can easily attach and remove a guide that will aid the hitch ball to align in the correct coupling position under the trailer drawbar so that the same may be lowered into engagement with the hitch ball. Further, a trailer hitch guide that can operate with most any form of coupling device used with a towing vehicle and trailer. In this regard, the present invention fulfills this need.

BRIEF SUMMARY OF THE INVENTION

The present invention is a portable trailer alignment device that aids with the alignment and approach of a towing vehicle toward a trailer.

Accordingly, a primary function of the trailer alignment apparatus is to provide a simple and effective means of trailer alignment and coupling with the towing vehicle, which solves the problems inherent with the prior art references in use today. As such, the general purpose of the present invention will be described subsequently in greater detail.

To attain this, the present invention essentially comprises a quick adjusting clamping system. Fixedly attached to the quick adjusting clamping system is a mast or lamp tube. The mast has an illumination means and a speaker means, with each spaced from a first end of the mast. Included is a pressure actuated paddle switch assembly. The pressure actuated paddle switch assembly is pivotally attached to the quick adjusting clamping system. The pressure actuated paddle switch assembly has a control lever that is in contact with a pair of switches attached to the quick adjusting clamp system for control of the illumination means and speaker means. The quick adjusting clamp system is fastened to a trailer hitch and has the illumination means and speaker means facing the rear of a towing vehicle. A driver of a towing vehicle backs up the towing vehicle to allow a hitch ball of the towing vehicle to engage the pressure actuated paddle switch. As the hitch ball moves the pressure actuated paddle switch rearward, in the direction of the trailer hitch, the illumination means, and the speaker means are activated. The illumination means and the speaker means, when turned on, will signal the driver when the hitch ball is in close proximity to a trailer coupling.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a trailer alignment apparatus, which is made of readily available, durable, weather resistant material to allow use of the device in any weather condition.

Another object of the present invention is to provide a new and improved trailer alignment apparatus, which may be easily and efficiently manufactured and marketed.

A further object of the present invention is to provide a trailer alignment apparatus that uses a universal clamping system, which allows quick mounting and dismounting of the apparatus to most any type of the trailer.

An even further object of the present invention is to provide a trailer alignment apparatus which is susceptible of a low cost of manufacture with regard to both materials and labor, and which accordingly is then susceptible of low prices of sale to the consuming public, thereby making such trailer alignment apparatus economically available to the buying public.

Still yet another object of the present invention is to provide a trailer alignment apparatus, which uses a single impact resistant paddle to trigger the visual and audio signaling system that informs the driver of the towing vehicle that proper alignment has occurred.

Still another object of the present invention is to provide the user with a trailer alignment apparatus that has a built-in height gauge on the light tube that allows the user to adjust the trailer cup to the proper operating height.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a frontal view of the flap in a horizontal plane.

FIG. 3 is a frontal view of the flap in a vertical plane.

FIG. 3a is a right side view of the flap of FIG. 3.

FIG. 5 is a side cross sectional view of the coupling of the flap to the lower member taken along lines 5—5 of FIG. 3.

FIG. 9 is a top plan view of the lower member of the apparatus of FIG. 1 showing a closed battery cover.

FIG. 10 is a right side view of the lower portion of the apparatus of FIG. 1, without the flap attachment.

Similar reference characters refer to similar parts throughout the several views of the drawings.

DETAILED DESCRIPTION OF THE INVENTION

Figure 1:
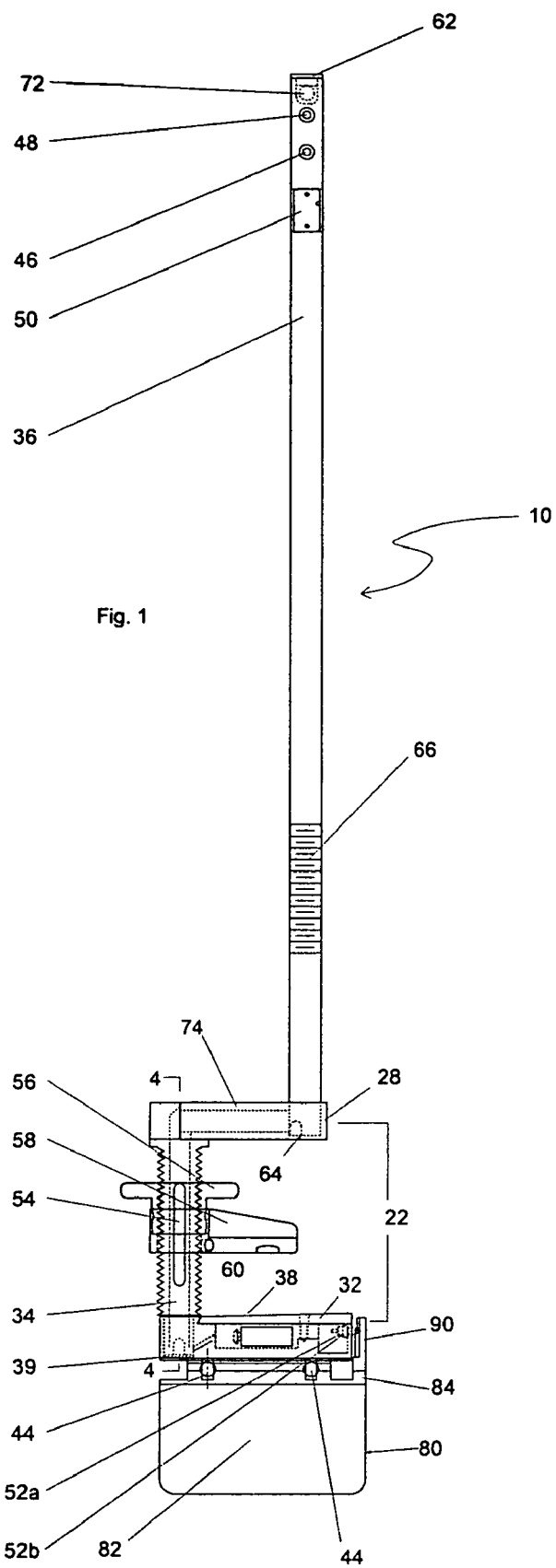
FIG. 1 is a perspective illustration of the preferred embodiment of the trailer alignment apparatus constructed in accordance with the principles of the present invention.

With reference now to the drawings, and in particular to FIG. 1 thereof, a trailer alignment apparatus embodying the principles and concepts of the present invention, and generally designated by the reference numeral 10, will be described.

The present invention, trailer alignment apparatus, is comprised of a plurality of components. Such components in their broadest context include quick adjustment clamp system, a light tube, and a pressure actuated paddle switch assembly. Such components are individually configured and correlated with respect to each other so as to attain the desired objective.

More specifically, the present invention, of FIG. 1 includes a quick adjusting clamping system 22 that is structured to allow the trailer alignment apparatus 10 to be fastened to the neck portion 24 of a trailer hitch 26. A single individual can fasten onto a trailer hitch and remove from the trailer hitch the quick adjusting clamping, without the aid of a helper.

The quick adjusting clamping system, as shown in FIG. 1, has an upper member 28, a lower member 32, and an adjusting screw 34. The upper member or tube holder has an opening sized to receive the mast 36. The lower member has an interior side 38, an exterior side 39, as shown in FIG. 9. The lower member has a pair of face panels 40, 41 and side panels 42, 43 therebetween. Coupled to one of the side panels is a pair of switches. In the present view of the invention, the switches are coupled to the right side 41 of the lower member. Extending from the exterior side of the lower member is two to three ball couplings 44.

Housed within the lower member 32 and as seen in FIG. 9 is the power source 45 for the illumination means 46, 48 and speaker means 50. The housing for the power source is accessed through a cover door of the interior side 38 of the lower member. The pair of switches 52a, 52b are in electrical communication with the power source, as depicted by the electrical schematic of FIG. 11.

Figure 4:
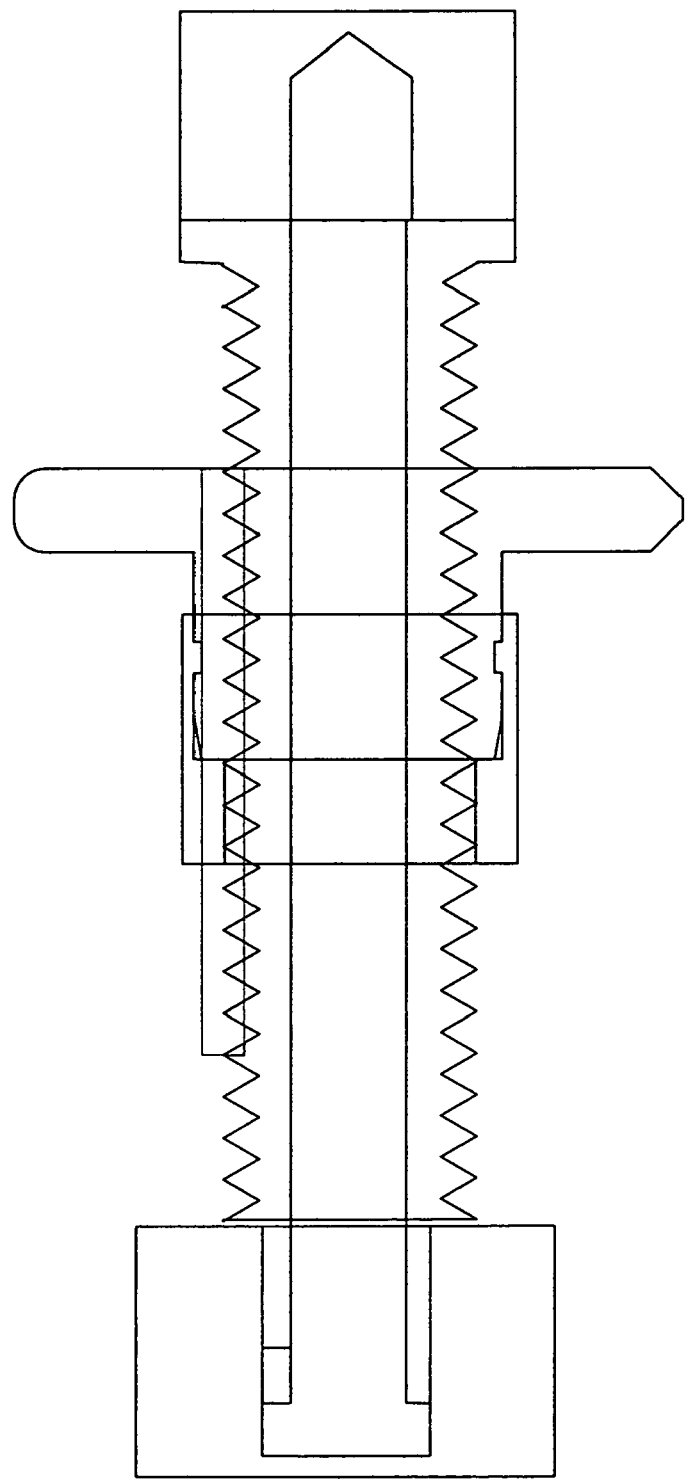
FIG. 4 is an enlarged cross sectional view of the adjustment screw, adjusting nut and rear of the clamp arm of FIG. 1.
Figure 6:
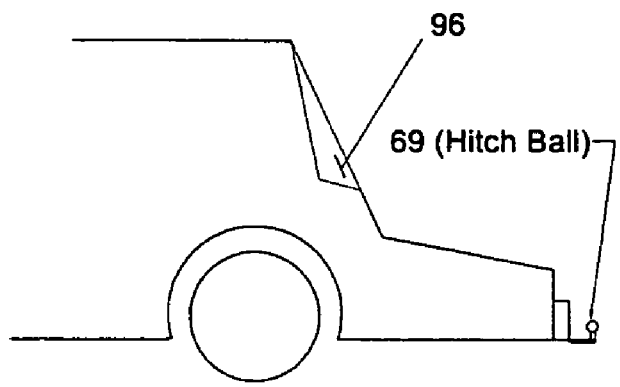
FIG. 6 is a side view of the vehicle showing a hitch ball coupled to a vehicle's rear and visual guide tape mounted on to the rear window.
Figure 7:
FIG. 7 is a frontal view of the visual guide tape.
Figure 8:
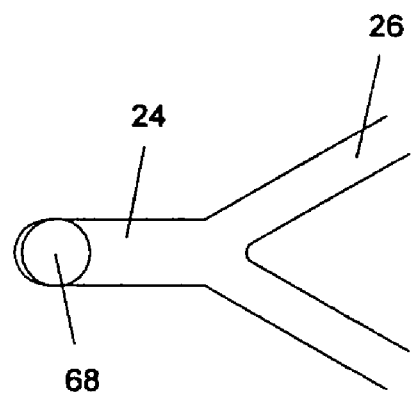
FIG. 8 is a top plan view of the front portion of a trailer.

The upper member and the lower member are interconnected by the adjusting screw 34 of FIG. 4. The adjusting screw has a threaded outer wall and a travel key 54 housed within. Further, mounted to the adjusting screw is an adjusting nut 56 and a clamp arm 58. The clamp arm moves along the adjusting screw by way of the travel key housed in the adjusting screw. The clamp arm is moved along the adjusting screw in order to increase and decrease the distance between the clamp arm and the lower member of the quick adjusting clamping system. By increasing and decreasing the distance between the clamp arm and the lower member, a receiving space 60, as shown in FIG. 1, is sized to allow the quick adjusting clamping of the trailer alignment apparatus to fit the neck 24 of a trailer hitch 26 similar to the one depicted in FIG. 8.

As illustrated in FIG. 1, the mast or light tube 36 has contained thereon an illumination means 46, 48 and speaker means 50. Specifically, the mast has a first end 62 and a second end 64. Incrementally positioned along the length of the mast is a plurality of measurement lines 66. These lines allow the user of the trailer alignment apparatus to use the mast as a height gauge. The height gauge is used to help the user adjust the height of the trailer cup 68 prior to backing of the towing vehicle for alignment of the hitch ball 69 with the trailer cup.

The illumination means 46, 48 and speaker means 50 are spaced from the first end of the mast. To keep moisture from entering the mast, an end cap 72 is snap fitted into the opening at the first end. The second end of the mast is fixedly attached to an exterior side 74 of the upper member 28. The illumination means is a first light and has a first color that can be a yellow lamp 46, and a second light has a second color that can be a red lamp 48. The lamp colors are not limited to yellow and red; the colors may vary as long as the color of the lamp for the first light is different from the color of the lamp for the second light.

The pressure actuated paddle switch assembly 80, as shown in FIGS. 1, 2, 3, 3a and 5, is pivotally attached to the lower member 32 of the quick adjusting clamping system. The pivotally actuated paddle system consists of a flap 82; the flap has a connection edge 84 with two to three slots 86 that are sized to receive the ball couplings 44 of the lower member of the quick adjusting clamping system. The slots of the connection edge snap fits about the ball couplings, as shown in FIG. 5, and allow the flap to rotate in the direction of the trailer body. Further, offset from the flap face and projecting upward from the connection edge is a control lever 90. The control lever of the flap is shown in FIG. 3a.

The control lever is offset from the face at an angle in order to rest to one side of the pair of switches when the pair of switches are in the off position. When the flap is rotated about the ball couplings 44, the control lever moves in the direction of the towing vehicle and presses against the pair of switches one at a time. Specifically, the first of the pair of switches 52*a* is pressed from the off position to the on position first, and the second of the pair of switches 52*b* is pressed last. When the trailer alignment apparatus is coupled to the trailer hitch, and the flap is engaged by the hitch ball 69, the first light is activated by a first of the pair of switches, and the second light is activated by a second of the pair of switches when the control lever is swung into an activation position as the flap is rotated. Specifically, as the flap rotates toward the trailer body, the control lever is rotated in a counter direction toward the towing vehicle to engage the pair of switches.

The speaker means 50 is comprised of a buzzer 50*a* that projects an audio indicator sound. When the control lever is swung into an activation position by the rotation of the flap to engage the first of the pair of switches, the first light and the buzzer are turned on. The two signals provide the driver operating the towing vehicle with a visual and audible signal that the hitch ball is in close proximity to the trailer coupling.

To use the trailer alignment apparatus, the operator sets the height of the trailer to a point approximately two inches above the top of the hitch ball 69 mounted to the rear of the towing vehicle. The operator uses the mast 36 to measure a height above the top of the hitch ball. Then the operator places the apparatus against the trailer 26 and adjusts the height according to the marking made on the mast previously set when measuring the height above the hitch ball.

Once the trailer height is set, the operator adjusts the distance, receiving space 60, between the clamp arm 58 and the lower member 32 of the quick adjusting clamp system. The adjustment will allow the apparatus to fit around the neck 24 of the trailer hitch 26. After placing the quick adjusting clamp system around the neck of the trailer hitch, the adjusting nut 56 is turned in order to move the clamp arm juxtapose the trailer neck and locking the quick adjusting clamp system in place. When the quick adjusting clamp system is in the correct position, the illumination means and the speaker means face the rear window of the towing vehicle. In most instances, this adjustment is only done the first time so that future uses will already have a side to side alignment. It must be done when the towing vehicle and trailer are hooked together. With the trailer alignment apparatus in place, the operator mounts a visual guide tape 96 to the inside center bottom of the rear window of the towing vehicle. The visual guide tape can be left on the rear window after coupling the towing vehicle and trailer. The operator can remove the visual guide tape because a number of pieces will be provided when the apparatus is purchased.

Now that the trailer alignment apparatus is fastened to the trailer and the visual guide tape is in position, the operator can proceed with backing the towing vehicle toward the trailer. As the towing vehicle moves backward, the operator centers the visual guide tape with the mast to center the towing vehicle with the trailer. As the towing vehicle moves rearward, the hitch ball begins to make contact with the flap 82 of the pressure actuated paddle switch assembly. The more the flap is swung rearward toward the trailer hitch, the control lever moves from the position of having no contact with the first of the pair of switches to contact with the first of the pair of switches.

When the control lever activates the first of the pair of switches 52*a*, the yellow lamp comes on and the buzzer sounds. Preferably the buzzer is a Piezo style audio indicator, but any standard buzzer can be used. With the activation of the yellow lamp and the buzzer, the operator is now aware that the hitch ball is in close proximity to the center point of the ball hitch trailer coupling. It is at that time the operator stops and again proceeds rearward at a slower pace, without making any changes in the direction of the towing vehicle wheels. Continued rearward movement of the towing vehicle pushes the flap further until the control lever activates the red lamp 52*b*. Activation of the red lamp means that the hitch ball 69 and the trailer cup 68 are in proper alignment, and the trailer cup can be lowered onto the hitch ball.

Prior to coupling of the towing vehicle and the trailer hitch, the operator turns the adjusting nut to release the clamp arm from around the neck of the trailer hitch. Releasing the quick adjusting clamping system from the trailer hitch allows the trailer alignment apparatus to be removed. The operator can reset the flap of the pressure actuated paddle switch by applying a light force to the flap in a forward direction. This resetting of the flap switches the lights and buzzer off. After removal of the trailer alignment apparatus, the hitch ball and trailer cup are coupled and locked in position.

Figure 11:
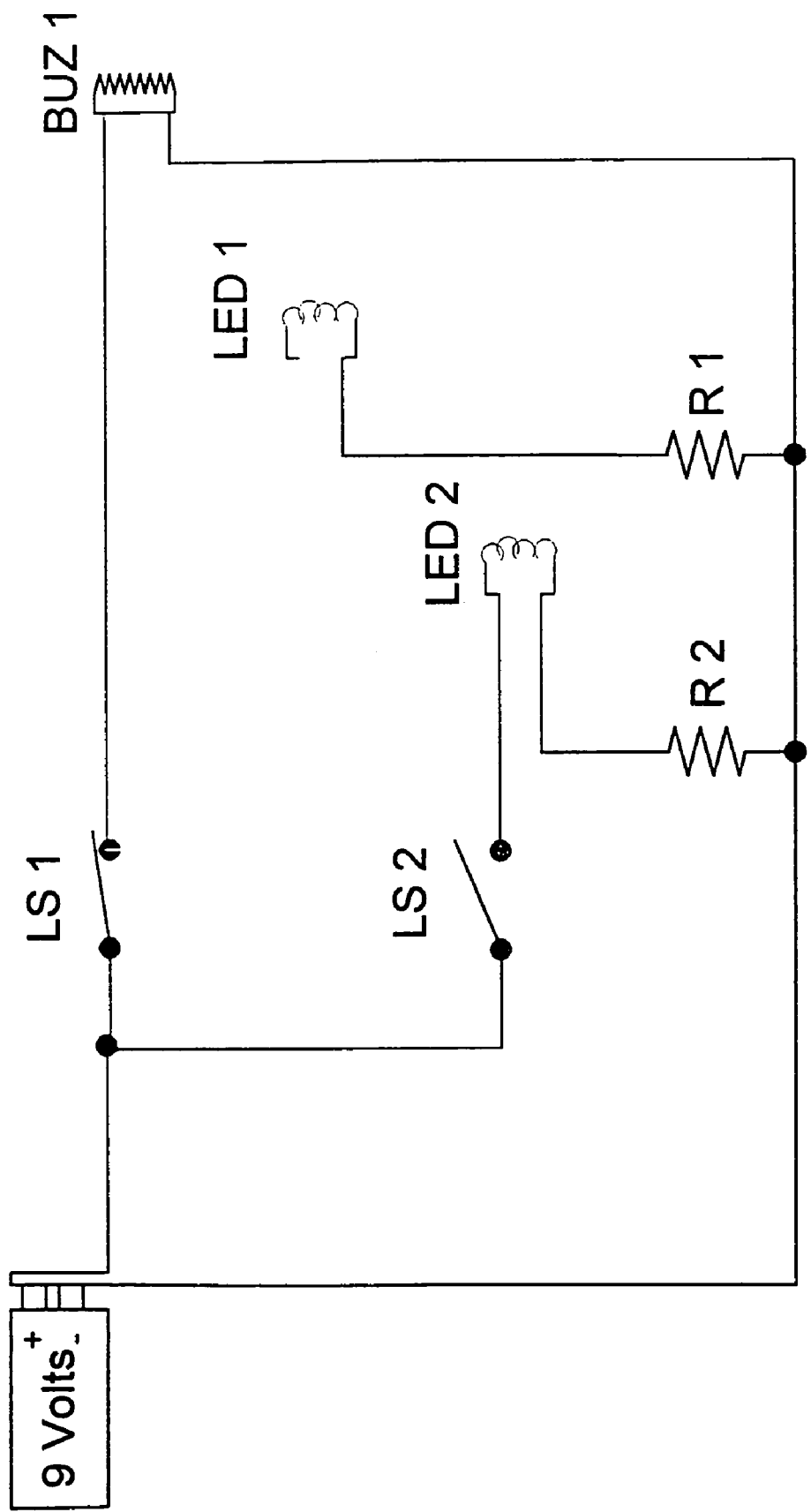
FIG. 11 is an electrical diagram of the signaling operation of the trailer alignment apparatus of FIG. 1.

It is to be understood that most any hitch unit 69 and corresponding coupler 68 can be used with this apparatus. Further, the illumination means and the speaker means are electrically connected to the power source as shown by the schematic of FIG. 11.

With respect to the above description then, it is to be realized that the optimum dimensional relationships for the parts of the invention, to include variations in size, material, shape, form, function and manner of operation, and assembly, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, equitably entitled.

What I claim as my invention is:

1. A trailer alignment apparatus comprising, in combination a quick adjusting clamping system that has an upper member and a lower member;

a mast fixedly attached to the upper member of the quick adjusting clamp system and being extended therefrom, the mast having an illumination means and a speaker means spaced from a first end thereof; and a pressure actuated paddle switch assembly pivotally attached to the lower member and having a control lever in contact with a pair of switches attached to the lower member for control of the illumination means and speaker means.

2. The trailer alignment apparatus as set forth in claim 1, wherein the quick adjusting clamp system is further comprised of an adjusting screw positioned between the upper member and the lower member, with the adjusting screw having an adjusting nut and a clamp arm mounted thereon.

3. The trailer alignment apparatus as set forth in claim 2, wherein the adjusting screw having a travel key housed therein to allow the clamp arm to move along the adjusting screw to increase and decrease a distance between the clamp arm and the lower member for fastening the quick adjustment clamp system onto a trailer hitch.

4. The trailer alignment apparatus as set forth in claim 3, wherein the adjusting nut is positioned on the adjusting screw between the upper member and the clamp arm, and the adjusting nut will lock the clamp arm in position about the adjusting screw when the desired distance between the clamp arm and the lower member is achieved for secure placement of the quick adjusting clamp system about the trailer hitch.

5. The trailer alignment apparatus as set forth in claim 1, wherein the mast is lined for use as a measuring device.

6. The trailer alignment apparatus as set forth in claim 1, wherein, the lower member has an interior side, an exterior side with a pair of face panels and side panels therebetween, housed within the lower member is the power source for the illumination means and speaker means of the mast, with the pair of switches coupled to one of the side panels.

7. The trailer alignment apparatus as set forth in claim 6, wherein the pressure actuated paddle switch assembly pivots away from a towing vehicle when a hitch ball presses against a flap portion thereof, and the pivoting of the flap causes the control lever to swing juxtapose to the side panels having the pair of switches, whereby as the control lever swings the pair of switches are turned on one at a time.

8. The trailer alignment apparatus as set forth in claim 7 wherein, the illumination means is comprised of a first light and a second light, and wherein the first light is activated by a first of the pair of switches, and the second light is activated by a second of the pair of switches when the control lever is swung into an activation position by the rotation of the flap.

9. The trailer alignment apparatus as set forth in claim 8 wherein the first light is a first color, and the second light is second color.

10. The trailer alignment apparatus as set forth in claim 7 wherein, the speaker means is comprised of a buzzer that projects an audio indicator sound, and when the control lever is swung into an activation position by the rotation of the flap to engage the first of the pair of switches, the first light and the buzzer are turned on, whereby a driver operating a towing vehicle is signaled visually and audibly that the hitch ball is in close proximity to the trailer coupling.

11. A trailer alignment apparatus comprising, in combination
   a quick adjusting clamping system;
   a mast fixedly attached to the quick adjusting clamping system, the mast having an illumination means and a speaker means spaced from a first end thereof;
   a pressure actuated paddle switch assembly pivotally attached to the quick adjusting clamping system, and having a control lever in contact with a pair of switches attached to the quick adjusting clamp system for control of the illumination means and speaker means; and
   whereby, the quick adjusting clamp system is fastened to a trailer hitch with the illumination means facing the rear of a towing vehicle, such that as a driver of a towing vehicle backs up to allow a hitch ball of the towing vehicle to engage the pressure actuated paddle switch, the illumination means and the speaker means are activated to signal the driver when the hitch ball is in close proximity to a trailer coupling.

12. The trailer alignment apparatus of claim 11, wherein the quick adjustment clamping system is further comprised of an upper member and a lower member with an adjusting screw positioned therebetween.

13. The trailer alignment apparatus of claim 12, wherein the adjusting screw has an adjusting nut and a clamp arm mounted there on, with the adjusting nut spaced from the upper member and the clamp arm spaced from the lower member.

14. The trailer alignment apparatus of claim 13, wherein the clamp arm is capable of moving along the adjusting screw for increasing and decreasing a distance between the clamp arm and lower member.

15. The trailer alignment apparatus of claim 14 wherein the distance between the clamp arm and the lower member is determined by the size of a neck portion of a trailer, wherein achievement of the desired distance allows the quick adjusting clamp system to be fastened onto the neck portion of the trailer.

16. A trailer alignment apparatus comprising, in combination
   a quick adjusting clamping system that has an upper member and a lower member;
   a mast fixedly attached to the upper member of the quick adjusting clamp system and being extended therefrom; the mast is lined for use as a measuring device, and the mast has an illumination means and a speaker means spaced from a first end thereof;
   a pressure actuated paddle switch assembly pivotally attached to the lower member and having a control lever in contact with a pair of switches attached to the lower member for control of the illumination means and speaker means; and
   the lower member having a power source housed therein, whereby when the pressure actuated paddle switch assembly is rotated by a hitch ball pressing against it, the control lever makes contact with a first of the pair of switches to activate the illumination means and the speaker means to signal a driver that the hitch ball is in close proximity with a trailer coupling.

* * * * *